Figure 1:
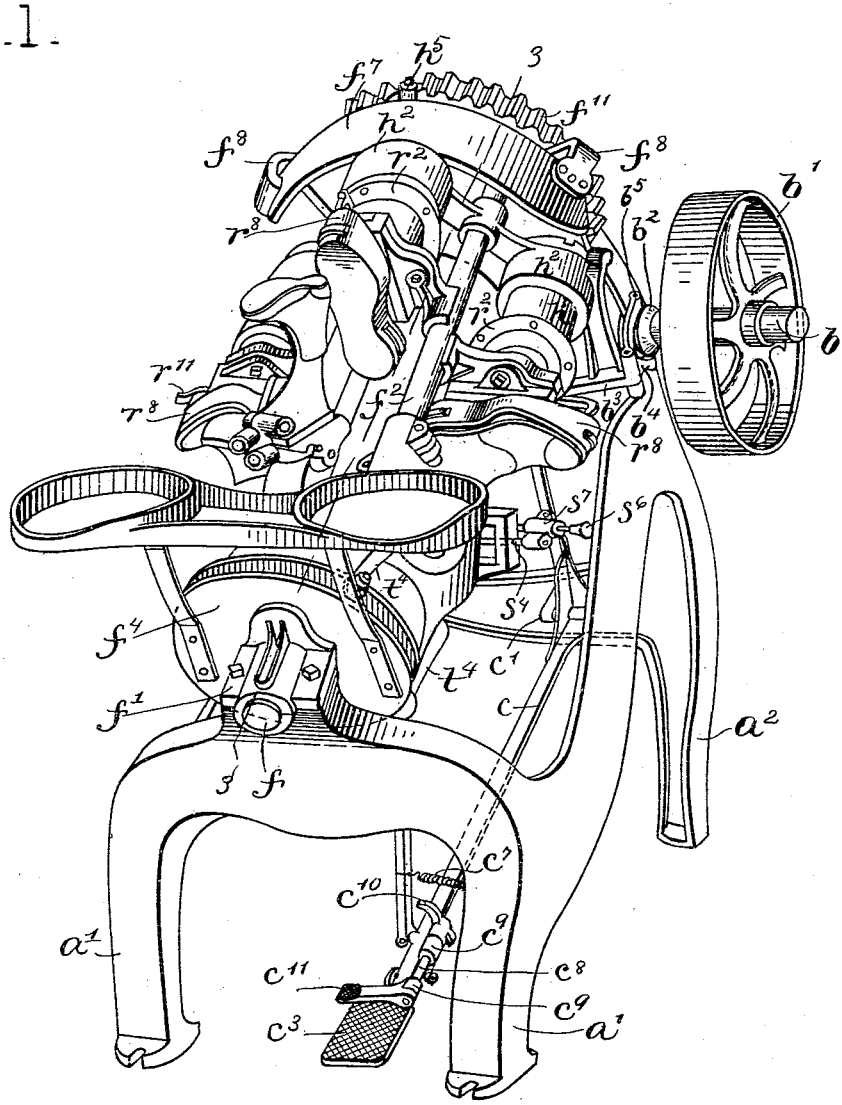

No. 684,239. Patented Oct. 8, 1901.
J. J. HEYS.
LEVELING MACHINE.
(Application filed Dec. 26, 1899.)

(No Model.) 6 Sheets—Sheet 1.

WITNESSES:
E. Batchelder
C. C. Stecher

INVENTOR:
John J. Heys
By Wright, Brown & Quinby
Attys

No. 684,239. Patented Oct. 8, 1901.
J. J. HEYS.
LEVELING MACHINE.
(Application filed Dec. 26, 1899.)

(No Model.) 6 Sheets—Sheet 2.

WITNESSES:
E. Batchelder
C. C. Stecher

INVENTOR:
John J. Heys
By Wright, Brown & Quinby
Attys

THE NORRIS PETERS CO., PHOTO-LITHO., WASHINGTON, D. C.

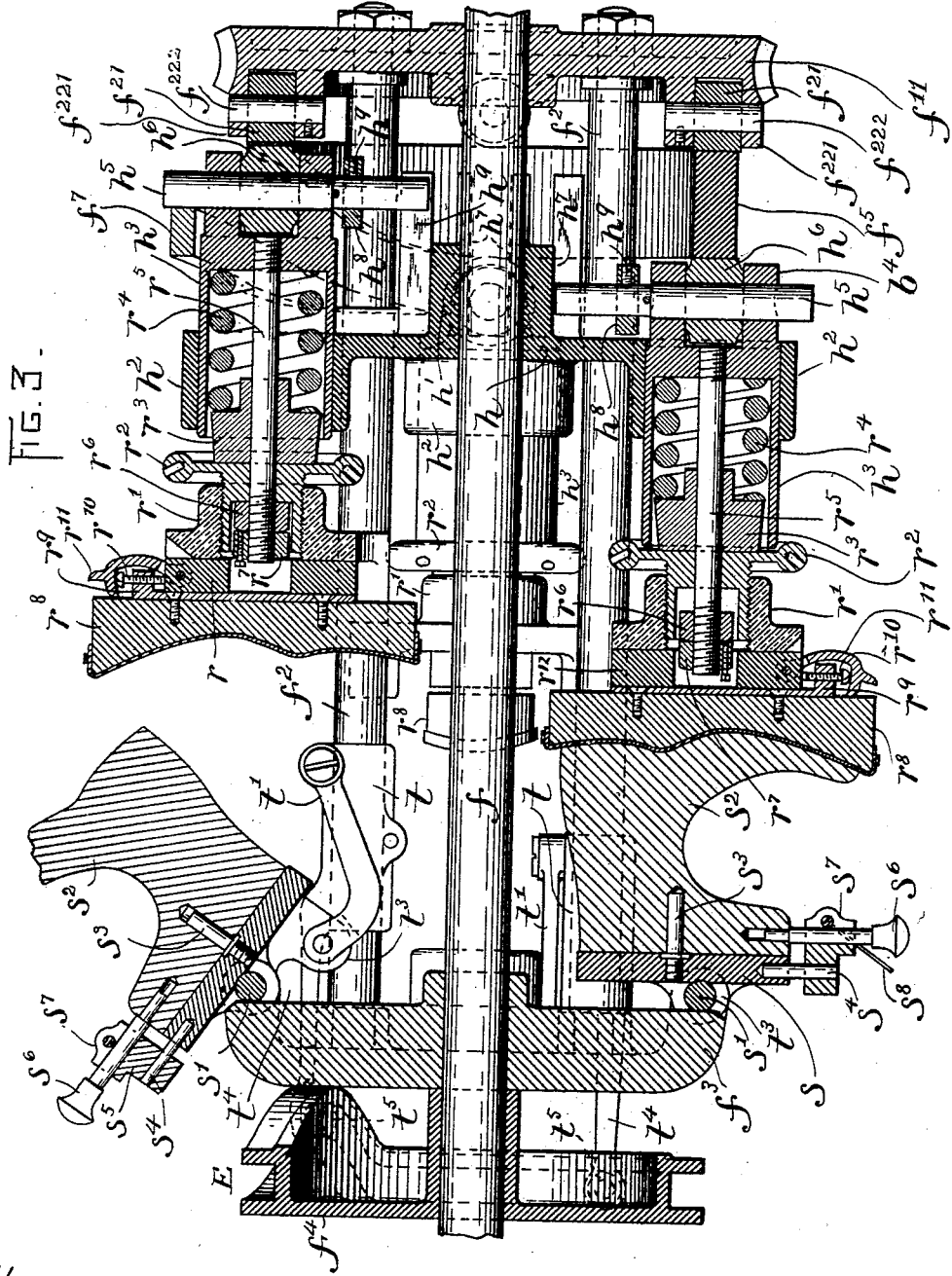

No. 684,239. Patented Oct. 8, 1901.
J. J. HEYS.
LEVELING MACHINE.
(Application filed Dec. 26, 1899.)
(No Model.) 6 Sheets—Sheet 4.

Witnesses:
E. Batchelder
C. C. Stecher

Inventor:
John J. Heys
By Wright, Brown & Quinby
Attys

No. 684,239. Patented Oct. 8, 1901.
J. J. HEYS.
LEVELING MACHINE.
(Application filed Dec. 26, 1899.)
(No Model.) 6 Sheets—Sheet 5.

WITNESSES:
E. Batchelder
C. C. Stecher

INVENTOR:
John J. Heys
By Wright, Brown & Quimby
Attys

No. 684,239. Patented Oct. 8, 1901.
J. J. HEYS.
LEVELING MACHINE.
(Application filed Dec. 26, 1899.)
(No Model.) 6 Sheets—Sheet 6.

WITNESSES:
E. Batchelder
C. C. Stecher

INVENTOR:
John J. Heys
By Wright, Brown & Quinby
Attys.

UNITED STATES PATENT OFFICE.

JOHN J. HEYS, OF LYNN, MASSACHUSETTS.

LEVELING-MACHINE.

SPECIFICATION forming part of Letters Patent No. 684,239, dated October 8, 1901.

Application filed December 26, 1899. Serial No. 741,645. (No model.)

*To all whom it may concern:*

Be it known that I, JOHN J. HEYS, of Lynn, in the county of Essex and State of Massachusetts, have invented certain new and useful Improvements in Leveling-Machines, of which the following is a specification.

This invention relates to a new and improved leveling-machine; and it consists in certain novel features of construction and arrangement of parts, which will be hereinafter fully described in the specification, clearly illustrated in the drawings, and particularly pointed out in the claims.

Reference is to be had to the accompanying drawings, and the characters marked thereon, which form a part of this specification, in which like characters designate like parts or features wherever they occur.

Figure 2:
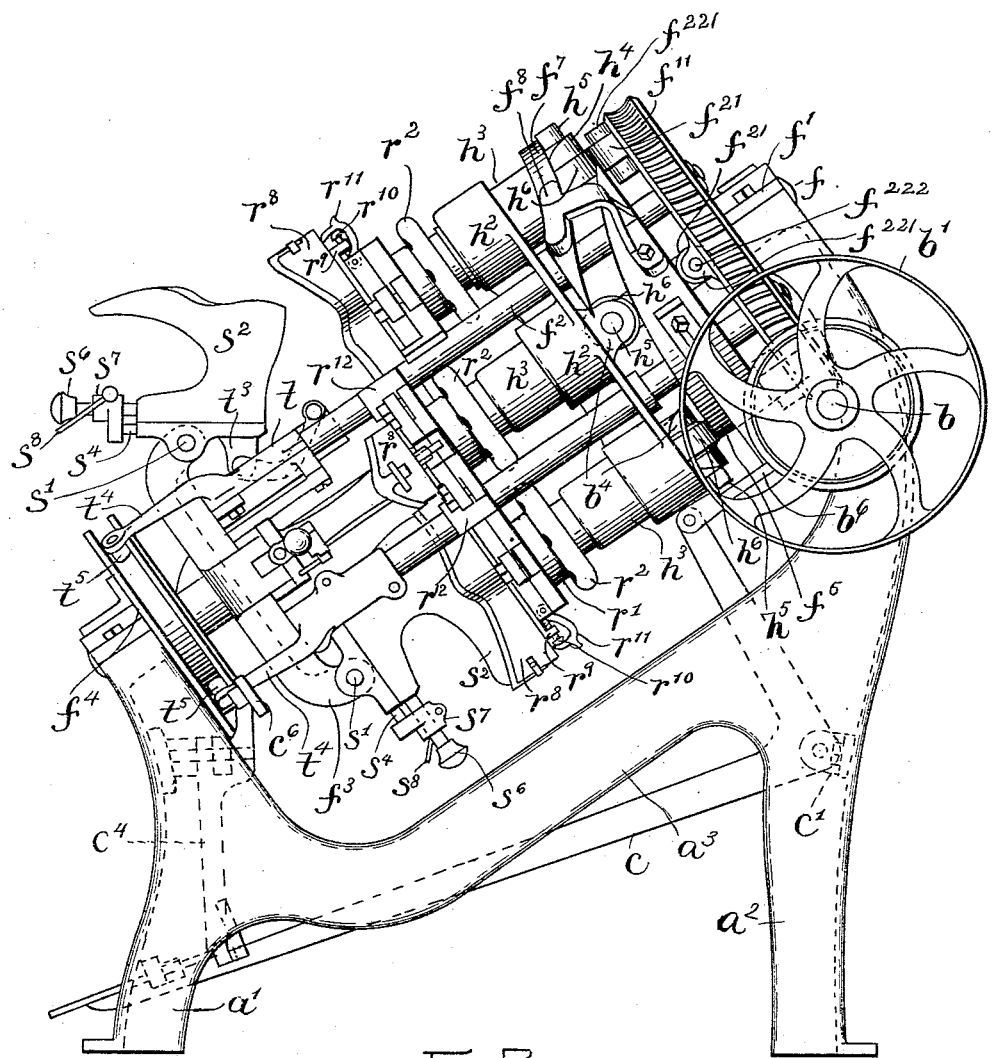
Figures 4, 5:
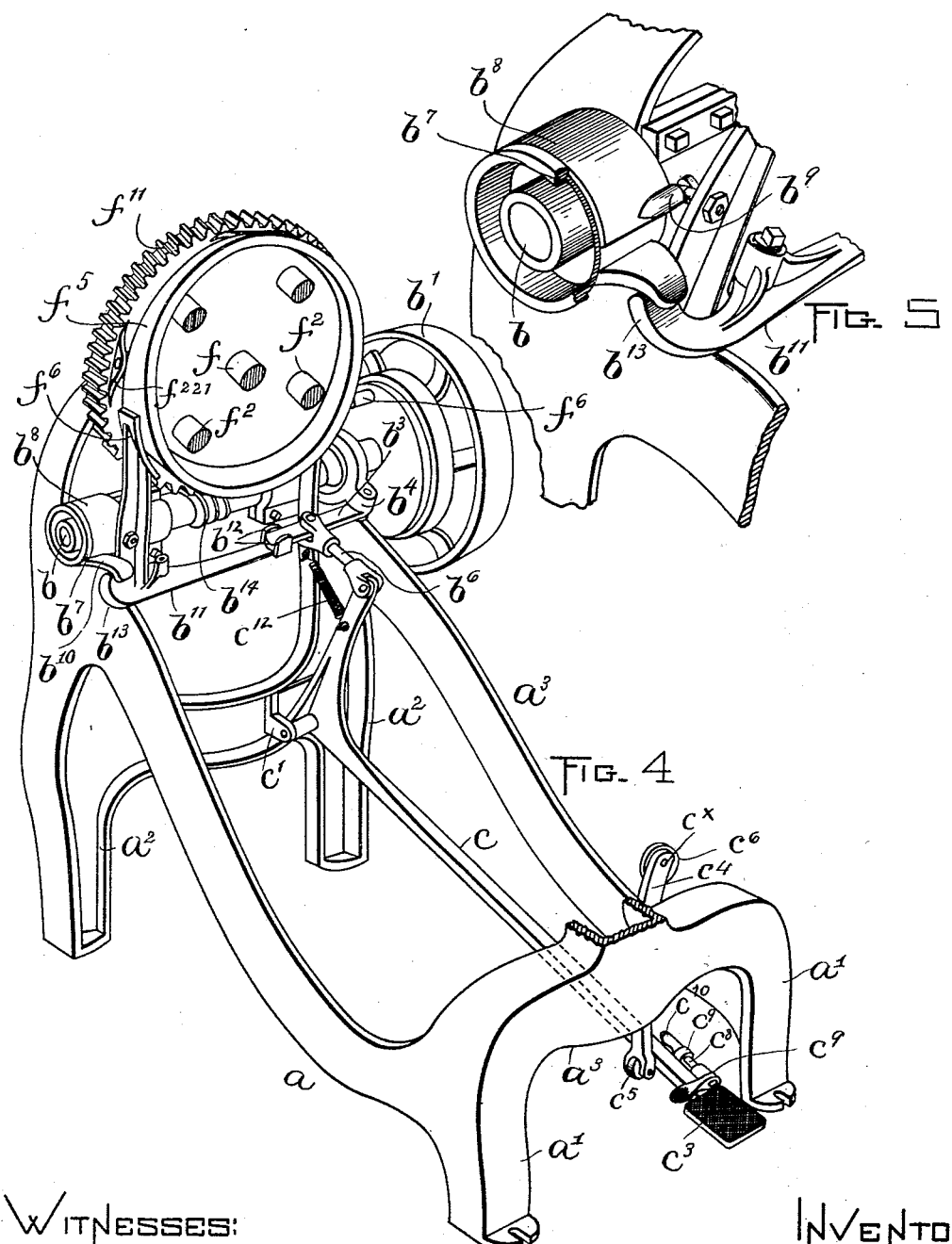
Figure 6:
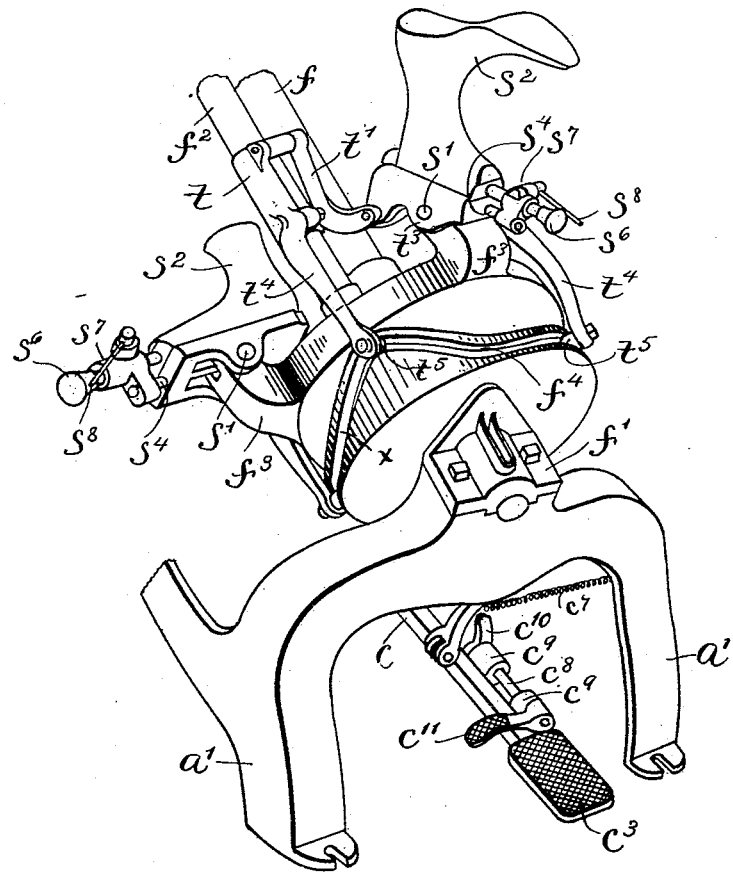
Figure 7:
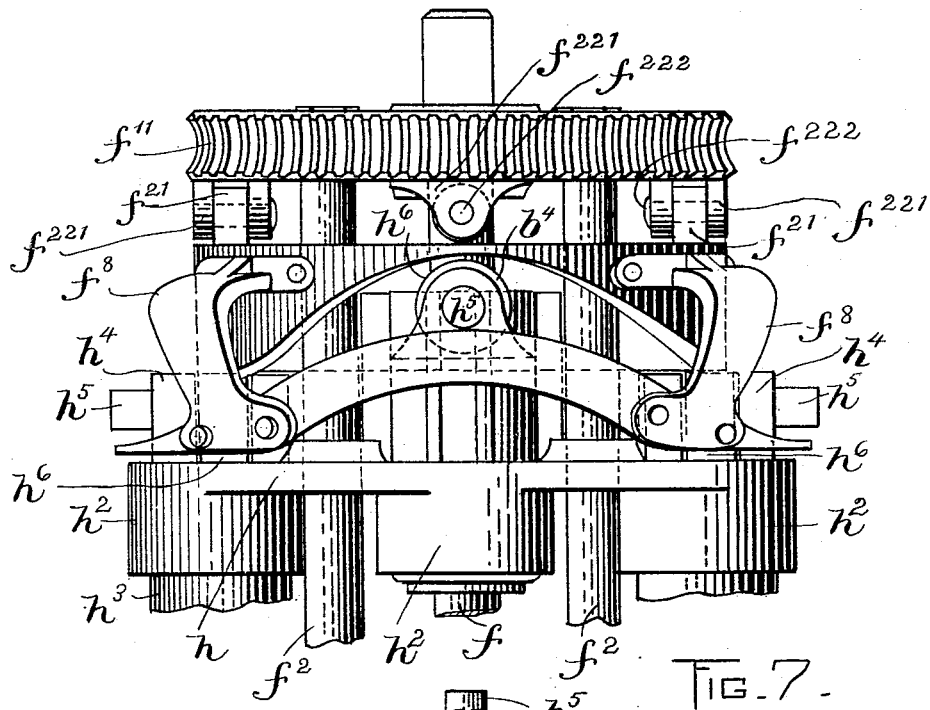
Figure 8:
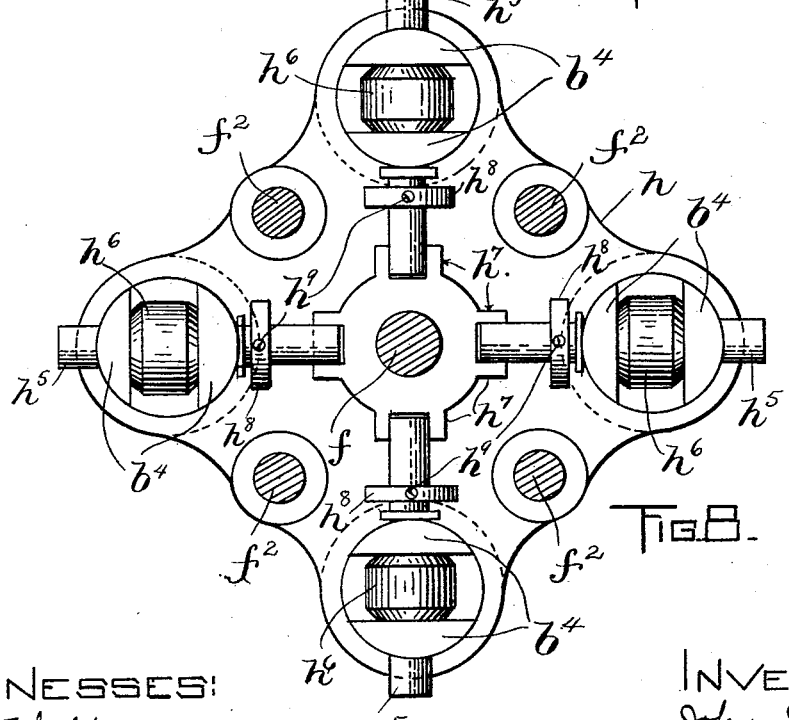

Of the drawings, Figure 1 represents in perspective a machine embodying my invention. Fig. 2 represents a side elevation of the same. Fig. 3 represents a longitudinal sectional view of the machine on the line 3 3 of Fig. 1. Fig. 4 represents a perspective view of the frame of the machine. Fig. 5 represents a detail view of the brake mechanism. Fig. 6 represents a detail view of the mechanism for tilting the jacks. Fig. 7 represents a front elevation of the upper end of the machine, showing the arrangement of the gearing and the movable members with relation to the stationary cam. Fig. 8 represents a top plan view of the upper end of the framework, showing the arrangement of the antifriction-rollers carried by the movable mold members.

Referring to the drawings, in the embodiment of my invention therein shown and selected by me for the purpose of illustration, $a$ represents the standard of the machine. (See Fig. 4.) This standard is composed of front legs $a'$, rear legs $a^2$, and suitable connecting-bars $a^3$. The rear legs $a^2$ are longer than the front legs $a'$, thus holding the framework and mechanism of the machine in a tilted position, as distinguished from either a vertical or a horizontal position.

$b$ represents a shaft mounted in suitable bearings in the standards at the rear end of the machine. $b'$ represents a wheel loosely mounted upon said shaft and adapted to be driven from any source of power. $b^2$ represents a clutch mechanism splined upon said shaft in the usual way and adapted to be connected to and disconnected from the wheel $b'$ in order to start and drive the machine or stop it.

$c$ represents a treadle-lever, here shown as a bell-crank pivoted at its angle to a bracket $c'$ at the rear of the machine. A footpiece $c^3$ is formed upon the end of the long arm of the lever.

$c^4$ represents a lever pivoted midway between its ends upon the front bar $a^3$ of the standard. The lower end of this lever is provided with a roller $c^5$ and the upper end with a roller $c^6$. The roller $c^6$, as shown, is an eccentric secured to the end of the lever $c^4$ by a screw $c^{\times}$. By adjusting the eccentric the time when the eccentric is engaged by the jack to trip the lever $c^4$ can be varied at will.

$c^7$ is a spring connected at one end with the lever $c^4$ and at its other end to one of the legs $a'$ in such a way that the spring normally tends to draw the roller $c^5$ onto the top of the lever $c$ when the latter is depressed.

$c^8$ represents a short rod mounted in lugs $c^9$ upon one side of the lever $c$, close to the footpiece $c^3$.

$c^{10}$ is a finger fast upon the inner end of the shaft $c^8$ in a position to engage the lower end of the lever $c^4$ when it is moved toward said lever by the rocking of the shaft $c^8$. This movement of the shaft $c^8$ is effected by means of a footpiece $c^{11}$, fast upon the outer end of the shaft $c^8$, in close proximity to the footpiece $c^3$. When the lever $c$ is depressed to start the machine, as hereinafter described, the spring $c^7$ draws the roller $c^5$ upon the top of the lever $c$. By this means the lever $c$ is held depressed until the roller $c^6$ is engaged by one of the jacks, when the roller $c^6$ is carried to the right in Fig. 1, thereby withdrawing the roller $c^5$ from the lever $c$, permitting said lever to be lifted and the power thrown off the shaft $b$. If for any reason it is desired to stop the machine after it has once started before the lever $c^4$ is tripped automatically, as described, the operator by depressing the footpiece $c^{11}$ can force the finger $c^{10}$ against the rod $c^4$ to trip the same and permit the treadle to rise. Should the operator desire to control the movement of the machine as a shoe is going into pressure or otherwise, he can by simultaneously depressing the pieces $c^3$ and $c^{11}$ start the machine, prevent the roller $c^5$ from engaging the top of the lever $c$, and thus stop the machine at any desired point by removing his foot from the pieces $c^3$ and $c^{11}$.

$c^{12}$ is a spring connected at one end to the short arm of the lever $c$ and at the other end to the standard $a^2$ at the rear of the machine in such a way as to normally tend to throw the front end of the lever $c$ or the footpiece $c^3$ upward and to maintain it in its raised position or the position it occupies when the clutch $b^2$ is disconnected.

$b^3$ represents a bell-crank pivoted at its angle to the rear end of the standard of the machine. One arm of this bell-crank is formed as a fork $b^4$ and is connected by a pin $b^5$ to the sliding member of the clutch $b^2$ in the usual manner. The other arm of this lever is connected by a pitman $b^6$ to the end of the short arm of the bell-crank $c$.

$b^7$ represents a wheel fast upon the shaft $b$ on the opposite side of the machine from the wheel $b'$.

$b^8$ represents a brake-strap one end of which is secured to the standard of the machine by a screw $b^9$. This strap passes around the wheel $b^7$, as shown, and its free end is formed with a finger $b^{10}$.

$b^{11}$ represents a lever pivoted midway of its ends upon the standard at the rear of the machine, but on the same side of the machine as the pulley $b^7$. At one end of this lever is formed a pair of lugs $b^{12}$, which loosely embrace the free end of the long arm of the bell-crank $b^3$. The other arm of the lever $b^{11}$ is formed with a finger $b^{13}$, arranged to engage the finger $b^{10}$ of the brake-strap. This brake-strap is composed of a metal ring fitting snugly to the wheel $b^7$ about the entire periphery of the latter and when moved by the finger $b^{13}$ acts as a part of the grip.

From the described construction it will be seen that when the lever $c$ is depressed by means of the pitman and the bell-crank $b^3$ the clutch $b^2$ will be thrown into engagement with the power-wheel $b'$. This movement of the treadle also throws the finger $b^{13}$ away from the finger $b^{10}$ of the brake-strap, thereby loosening the latter. When the treadle $c^3$ is raised by the spring $c^{12}$, the operations just described are reversed—that is, the clutch $b^2$ is disengaged from the wheel $b'$ and the finger $b^{13}$ is thrown into engagement with the finger $b^{10}$ to tighten the brake-strap on the pulley $b^7$ and stop the motion of the machine.

$f$ represents a shaft mounted in suitable bearings $f'$, connected to the standard at either end of the machine.

$f^{11}$ represents a worm-gear fast upon the shaft at the rear end of the machine and arranged to mesh with and be driven by a worm $b^{14}$ upon the shaft $b$.

$f^2 f^2 f^2 f^2$ represent rods bolted at one end to the gear $f^{11}$ and at their other ends secured to a disk $f^3$, fast upon the shaft $f$ at the front of the machine. These rods $f^2$, as shown, run parallel with the shaft $f$ and serve as guides for the reciprocating molds, hereinafter described.

$f^4$ represents a stationary path-cam at the front of the machine.

$f^5$ represents a stationary cam at the rear end of the machine, immediately adjacent and in front of the work-gear $f^{11}$. The cam $f^5$ is suitably supported by parts $f^6$, secured to said cam and to the standard of the machine. The cam $f^5$ has its high part, by which the presses are shut, underneath the machine, and its low or neutral point, where the presses are opened, at the top of the machine. (See Fig. 4.)

$f^7$ represents a cam arranged on top of the machine. (See Figs. 2, 3, and 7.) This cam is supported by arms $f^8$, extending from the cam $f^5$ on opposite sides of its neutral point, near the top of the machine. (See Fig. 7.) The cam $f^5$ is arranged to engage the rollers $h^6$ to shut the presses, while the cam $f^7$ is arranged to engage an extension on the hub $h^5$ in order to open the presses. The hub $h^5$, if desired, may be provided with rollers to engage the cam $f^7$. It will thus be seen that the presses go into pressure gradually as they go under the machine and that the presses are open as they come to the top of the machine, the cam $f^5$ serving to shut the presses and the cam $f^7$ serving to open the presses. The gear $f^{11}$ is provided with a plurality of pairs of lugs $f^{221}$ to receive pins $f^{222}$, upon which are journaled rollers $f^{21}$, which bear directly against the cam.

$h$ represents a guide-plate, formed with a hub $h'$, secured to the shaft $f$ immediately below the cam $f^5$. At the outer edge of this plate are formed four sockets $h^2$. In each of these sockets is arranged a cylinder $h^3$. This cylinder at its upper end is formed with a pair of ears $h^4$, adapted to hold a pintle $h^5$, upon which is mounted a roller $h^6$ between said ears. The inner end of the pintle $h^5$ is arranged between two vertical guides $h^7$, formed on the hub $h'$.

$h^8$ is a stop secured to the pintle by a set-screw $h^9$, which serves to limit the downward movement of the cylinder $h^3$ by engagement with the disk $h$. The roller $h^6$ is arranged to be engaged by the path-cam $f^5$, being depressed by the upper part of said cam and raised by the lower part of said cam. The rollers $h^6$ and $f^{21}$ are directly opposite each other, as shown in Fig. 3.

$r$ represents a mold-carrier having a screw-threaded extension $r'$.

$r^2$ is an adjusting-wheel having screw-threads engaging screw-threads of the extension $r'$.

A shoulder $r^3$ is arranged in the cylinder $h^3$. $r^4$ represents a spring arranged in said cylinder and bearing at one end against the upper end of the cylinder and at its other end against the shoulder $r^3$.

$r^5$ represents a rod secured at its upper end to the base of the cylinder $h^3$. This rod passes down through an opening in the hand-wheel $r^2$ and into a chamber formed at the lower part of said hand-wheel and in the mold-carrier. This rod has on its lower end a retaining-nut $r^6$ and a check-nut $r^7$.

$r^8$ represents a mold connected to a sliding plate $r^9$, adjustably secured to the mold-carrier $r$. A screw $r^{10}$ passes through said plate and engages the carrier $r$. By means of this screw the sliding plate $r^9$ and its mold can be adjusted. $r^{11}$ represents a latch arranged to engage the screw $r^{10}$ and hold the plate in its adjusted position. The mold-carrier $r$ is formed upon either side with a guide $r^{12}$, which engages and slides upon two contiguous rods $f^2$. The mold-carrier is therefore guided by the sockets $h^2$ and the guides $r^{12}$, and the hand-wheel is in a convenient position for adjusting the mold-carrier. As shown in the drawings, there are four of these reciprocating molds $r^8$ and connected mechanism; but as these structures are identical a description of one will suffice for all.

$s$ represents a jack-table pivoted at $s'$ to the disk $f^3$ between two of the rods $f^2$, there being a jack-table for each corresponding mold-carrier $r$.

$s^2$ represents a jack or last constituting the lower mold member, mounted upon the jack-table $s$. As here shown, a pin $s^3$ extends from the table $s$ into the jack. In order to retain the jack in place on the table, I secure to the table $s$ a pin $s^4$, which carries a block $s^5$. In this block a sliding pin $s^6$ is mounted. This pin $s^6$ is adjustably locked in place by a grip $s^7$, operated by a lever $s^8$. When it is desired to substitute one form of last or jack for another, the grip $s^7$ is loosened, the pin $s^6$ removed, and the jack or last taken off the table and another one put in its place, after which the pin $s^6$ is pushed forward into the jack or last and locked.

$t$ represents a sleeve arranged to slide upon one of the rods $f^2$. $t'$ is a pitman pivoted at one end to said sleeve and at its other end to a lug $t^3$ on the bottom rear portion of the pivoted jack-table $s$.

$t^4$ represents a pitman pivoted at one end to the lower part of the sleeve $t$ and carrying at its lower end a roller $t^5$, loosely arranged in the groove of the path-cam $f^4$. As the machine revolves the jack-tables remain in the position shown to the right in Fig. 3, except when the rollers on the pitman $t^4$ reach the incline $x$ of the path-cam. This incline forces up the pitman $t^4$ and the sleeve $t$, causing the jack-table and its jack to be tilted, as shown, to the left, in Fig. 3. Each of the jack-tables is connected up to the path-cam $f^4$ in a like manner, so that a description of one will suffice for all. By reason of the loose connection between the rollers $t^5$ and the path-cam $f^4$ the jack is given sufficient play to enable it to automatically position itself in engagement with its complemental mold and to prevent breaking the pitman $t^4$, which might occur if the jack were tilted slightly by the mold and the connection between the roller $t^5$ and the path-cam $f^4$ were so light or so close as not to admit of the described play. I do not confine myself to the particular means for effecting this described play.

The operation of the machine is as follows: A shoe having been placed upon the jack or last $s^2$, the lever $c$ is depressed and the machine started. The rotation of the machine will first throw the jack, that was in a tilted position or the position shown in Figs. 2, 3, and 6, back into position for pressure, or the position shown at the right in Fig. 3. Immediately thereafter the cam $f^5$ yieldingly forces down the mold $r^8$ upon the sole of the shoe. After this takes place and before the first mold has reached the limit of its throw its jack trips the lever $c^4$, stopping the machine. While the shoe just described is going into pressure the shoe upon the succeeding jack is being withdrawn from pressure, the mold being drawn up by the path-cam $f^5$. The shoe is not put under full pressure at the first operation. Before the roller $h^6$ of the mold that is moving out of pressure reaches the height of the incline on the cam $f^5$ the jack having the shoe that is going into pressure trips the lever $c^4$ and automatically stops the machine. At this time the mold of the succeeding press has been drawn up to the limit of its movement, and just as the machine stops the roller on the pitman $t^4$ on the succeeding jack-table is engaged by the incline $x$ of the path-cam $f^4$, thus automatically tilting the succeeding jack and its shoe out of the machine in a position where the shoe can be removed from the jack and another shoe placed thereon. The operation just described is repeated for the remaining jacks.

It will be noted that the machine stands in an inclined position, (see Fig. 2,) so that but a small motion is required to be given to the jack, about thirty-five degrees, in order to throw the sole of the shoe out of the machine and in a horizontal position. This arrangement of the machine is of great advantage, since the whole mechanism of the machine is practically removed from the vicinity of the operator and the jack is thrown out of the machine in a position where the necessary manipulation of the shoe can be made by the operator unhampered by the other mechanism of the machine. Further, the framework of the machine and the mechanism carried thereby are inclined and rotate, and the operator can watch the shoes as they go into pressure on one side and as they come out of pressure on the other side of the machine, thus being enabled to determine if the shoe is properly positioned for pressure before the full pressure is applied at the second operation and to determine if the shoe has been sufficiently pressed before starting the machine to give the shoe and its jack their final movement that brings them out of the machine to the front. One side of the shoe is presented to the operator as it goes into the machine and the other side as it comes out. The motion of pressure to be given the sole can thus be regulated by the operator, since he has a chance to see the action of the press on the shoe before final pressure is put on, and if this is going to be too great or too little he can correct this by turning the hand-wheel $r^2$ before again starting the machine. Another advantage of the described arrangement of mechanism is that it is practically impossible for the operator to be injured, as frequently happens with the upright class of the machine.

By referring to Figs. 1 and 2, it will be seen that the only press that comes toward the operator is one that is opening. Further, the press that is coming is the one requiring the operator's attention, the other closing press having been loaded and moving away in its simultaneously-closing action. After the machine is started the operator immediately turns his attention to the jack that is approaching him from beneath the machine, and in practical working the operator has removed the shoe by the time the jack has reached its position of rest, as shown in Fig. 6.

Having thus explained the nature of my invention and described a way of constructing and using the same, though without attempting to set forth all of the forms in which it may be made or all of the modes of its use, what I claim, and desire to secure by Letters Patent, is—

1. In a leveling-machine, a rotating framework, three or more molds and complemental jacks, means having their pressing plane at an inclination to the vertical for operating said parts comprising mechanism for automatically throwing said jacks successively to an upright position and back again out of their pressing plane.

2. In a leveling-machine, a rotating framework, a reciprocating mold mounted therein, means for operating the same, a complemental jack pivoted to the bed of the framework, a sliding sleeve, connections between said sleeve and jack, a stationary cam and connections between said cam and sleeve whereby the jack is automatically thrown in and out of its pressing plane as the cam and jack change positions in relation to each other.

3. In a leveling-machine, a rotary frame arranged in an inclined position, two or more reciprocating upper mold members, complemental pivoted jacks, the parts being so arranged that the mold members exert their force in a line inclined from a vertical, and connections between said jacks and some stationary part of the machine, whereby said jacks are automatically and successively thrown out of a plane occupied by the line of pressure to a substantially upright position as the jacks and said stationary part change position with relation to each other.

4. In a leveling-machine, a framework, a mold member and a pivoted jack carried thereby and arranged to exert their pressure in a plane inclined from the horizontal, and automatic means for operating said machine and moving said jack to a substantially upright position of clearance.

5. In a leveling-machine, a mold-carrier, a hand-wheel adjustably connected to said carrier, a pitman or member by which motion is imparted to said carrier, said pitman having a sliding connection with said carrier and hand-wheel, and a spring interposed between said pitman or a part carried thereby and said hand-wheel, whereby the yielding resistance of the carrier can be adjusted by mechanism upon the latter.

6. An adjustable die-carrier comprising a movable shell, a spring arranged therein, a mold-carrier, a hand-wheel adjustably connected to said carrier and arranged to engage said spring to adjust the latter, and a rod connected at one end to said shell and loosely connected at its other end with said wheel.

7. In a leveling-machine, an inclined rotating framework, pivoted jack-tables carried by one end of said framework, two or more reciprocating mold members carried by the other end of said framework, a gear-wheel carried by said framework, a stationary cam interposed between said gear and said molds, whereby as the cam and framework change position in relation to each other, the said molds are given a reciprocating motion toward and from their complemental jacks.

8. In a leveling-machine, a rotating framework arranged in an inclined position, two or more jacks pivoted to the lower end of said framework, two or more complemental reciprocating molds carried by the upper part of said framework, means for moving said molds toward and from the jacks, and means for automatically tilting the jacks to bring their pressing-surfaces into a horizontal plane, and stopping the machine.

9. In a leveling-machine in combination, a shaft, a stationary cam, a gear fast upon said shaft upon one side of the cam, movable mold members arranged upon the opposite side of said cam, and antifriction devices arranged between said cam and said gear.

10. In a leveling-machine, a plurality of molds and complemental pivoted jacks, means for carrying said molds and jacks so positioned that the molds and jacks may exert their force in lines inclined to the vertical and horizontal, and means for producing a relative movement of the molds and jacks to beat out the sole of the boot or shoe upon the jack, comprising mechanism for automatically throwing the jack into an upright position of clearance upon the completion of the pressing operation.

11. In a leveling-machine, one or more reciprocating pressure members, a driving member such as a gear, a cam arranged between said pressure and driving member, an antifriction-roller upon said pressure member arranged to engage said cam, an antifriction-roller upon the driving member arranged to engage said cam opposite the pressure-roller whereby as the cam and pressure member change positions with relation to each other to produce reciprocation of the pressure member, the point where pressure is exerted on the cam by the roller of a pressure member will be directly over the point where a roller of the driving member engages the cam.

12. A leveling-machine comprising molds and complemental jacks, oscillatory jack-carriers adapted to have an approximately upright position of clearance and a recumbent position for pressure, mold-carriers located with respect to the jacks whereby the mold complemental to an upright jack is out of contact therewith when the other mold and jack are in position of pressure, means for reciprocating said mold-carriers, and means whereby said jacks automatically alternately occupy a position for pressure.

13. A machine of the character specified comprising a jack, a complemental mold, means whereby said jack moves automatically from an upright position of clearance to a recumbent position for pressure, and means for causing the mold and jack to level the sole of the boot or shoe carried by the jack.

In testimony whereof I have affixed my signature in presence of two witnesses.

JOHN J. HEYS.

Witnesses:
M. B. MAY,
E. BATCHELDER.